United States Patent [19]
Eisemann

[11] 3,825,269
[45] July 23, 1974

[54] SHUT-OFF DEVICE FOR A RECORD CHANGER

[75] Inventor: Kurt Eisemann, Berlin, Germany

[73] Assignee: U.S. Philips Corporation, New York, N.Y.

[22] Filed: Apr. 13, 1972

[21] Appl. No.: 243,638

[30] Foreign Application Priority Data

May 25, 1971 Germany ............................ 2125708

[52] U.S. Cl. .............................................. 274/10 R
[51] Int. Cl. .......................................... G11b 17/08
[58] Field of Search ..................... 274/10 R, 9 R, 1 L

[56] References Cited

FOREIGN PATENTS OR APPLICATIONS 1,060,703 3/1967 Great Britain ...................... 274/1 L

*Primary Examiner*—Harry N. Haroian
*Assistant Examiner*—A. Jason Mirabito
*Attorney, Agent, or Firm*—Frank R. Trifari

[57] ABSTRACT

Shut-off device for a record changer in which one end of an initially tensioned leaf spring is secured in a switch-off track of a cam disc designed as a control mechanism. The other end of the leaf spring projects through an opening in the cam disc. A follower pin when travelling along the switch-off track thrusts the free spring end through the opening in the cam disc. This free spring end operates the on-off switch which is provided with mechanical time delay elements.

5 Claims, 6 Drawing Figures

PATENTED JUL 23 1974 BEST AVAILABLE COPY SHEET 2 OF 2 3,825,269

SHUT-OFF DEVICE FOR A RECORD CHANGER

Figure 1:
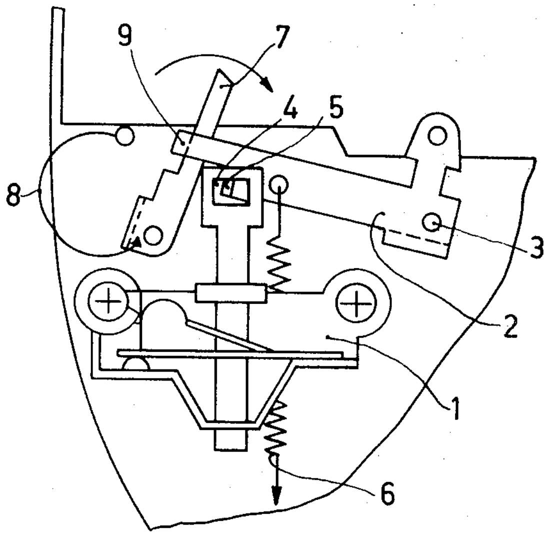

The invention relates to a shut-off device for a record changer having a cam disc which controls the change operation and contains a switch-off track. After the last record has been played, a follower pin provided on a control lever is guided into the track to actuate a switch. Record changers should have the capability of avoiding continuous playing of the last record until the user switches off the changer. Automatic shut-off should also be available in apparatus capable of operating not only as changers but also as semiautomatic or fully automatic record players.

German Pat. Specification No. 1,086,060 discloses a record changer having a cam disc which controls the swing movements of the tone arm and through a follower pin. It contains a switch-off track and an element for operating a motor switch which extends into the track. The follower pin, which is guided into the switch-off track by an impulse delivered by the changer itself, causes an outward displacement of the operating element which is provided on the rotating cam disc outside the switch-off track and has the form of a rotatably mounted plate. As a result, a pin provided on the operating element is moved into a path which lies in the range of an operating fork of the motor switch which is secured to the mounting plate of the apparatus. This permits the pin to engage in the operating fork and to operate the switch for switching off. This arrangement does not ensure that the pin is swung outward to a position which is accurately defined relative to the operating fork and retains this position during rotation up to the operating fork. The pin is liable to slide past the operating fork so as to be impelled towards the control disc. As a result shut-off of the known apparatus is unreliable.

In addition, the shut-off device of the known record changer does not include a mechanical time delay element which during the switch-off operation blocks the switch until the control disc has returned to the starting position with certainty. When shut-off is effected too early and the angular momentum of the turntable is not sufficient to move the control cam to its starting position, there is no certainty that when the apparatus is again switched on the control process precedes in a troublefree manner. Moreover, the angular momentum of the turntable depends upon the speed of the record just played, so that shut-off at an accurately defined instant, of the speed of the records, is not obtainable by means of the known shut-off device.

It is an object of the invention to provide a reliable shut-off device for a record changer in which the operating element for actuating the switch always travels the same predetermined path relative to the engaging lever of the switch and also, by the use of a mechanical time delay element, shut-off of the apparatus always takes place at an accurately defined instant.

For this purpose according to the invention a record changer of the type referred to at the beginning of this specification is characterized in that a leaf spring is disposed in the switch-off track which from one end secured to the bottom of the track and being first engaged by the follower pin gradually leaves the bottom of the track owing to its initial tension and in the region of the other end has a bent portion which extends through an opening in the cam disc. When the spring is depressed by the pin running over it, it engages behind the free end of a pivotable lever cooperating with a break switch and causes the lever to pivot until the lever causes the switching means to be operated with a given time delay.

The advantages of the invention are the provision of an element for operating the motor switch within the switch-off track. The path travelled, with the control cam rotating, by that part of the operating element which when actuated by the guide pin influences the pivoting lever of the fixed motor switch for shutting off the apparatus, always automatically is the same. The low cost of material and the possibility of manufacturing the operation element by, e.g., a single stamping operating will present additional advantages. The use of a mechanical time delay element ensures that the apparatus is shut off with certainty at an accurately defined instant.

In order to enable to control mechanism to function correctly when the record changer is switched on, the cam disc which controls the change operation must have returned to the starting position with certainty at the shut-off of the apparatus preceding the said switch-on operation. For this purpose known record changers include a cam disc which is provided with a recess into which an interval roller snaps when a change operation has terminated. At shut-off the motor must be switched off when the interval roller snaps into the recess in the cam disc.

In a preferred embodiment of the invention this is achieved in that the pivoting lever cooperates with an initially tensioned operating lever of the on-off switch and is provided with a stepped portion which after the predetermined pivoting movement of the pivoting lever releases the operating lever of the on-off switch for shut-off.

In order to determine the correct shut-off instant with an even higher degree of accuracy the leaf spring according to the invention has an initial tension which is sufficient to lock the pivoting lever by clamping action when the follower pin leaves the depressed leaf spring, the lever being released only when the bent portion of the operating lever slides from one step to the other step of the pivoting lever.

Figure 2:
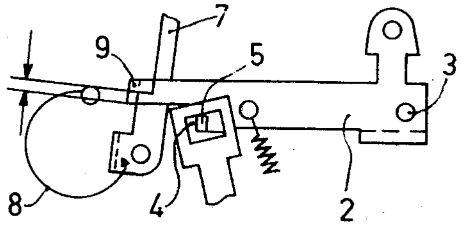
Figure 3:
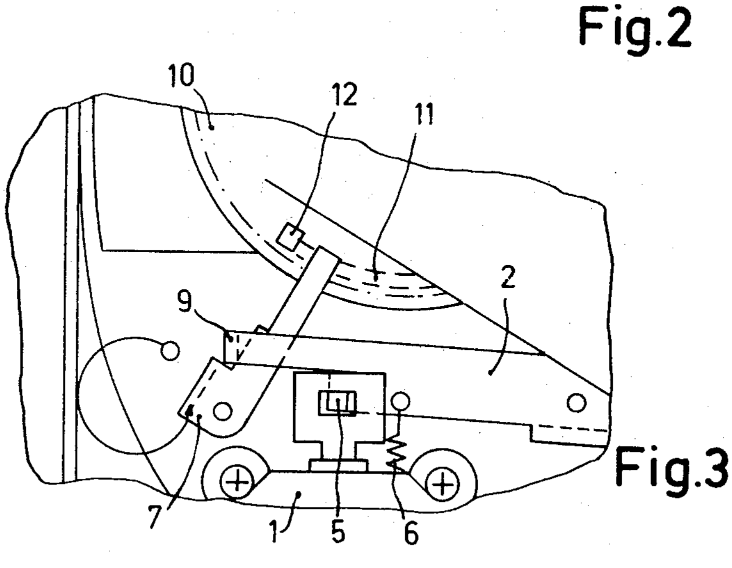
Figure 4:
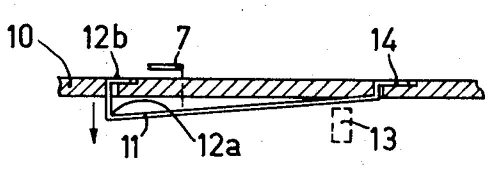
Figure 5:
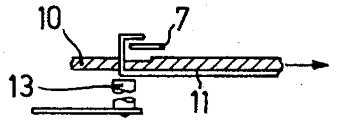
Figure 6:
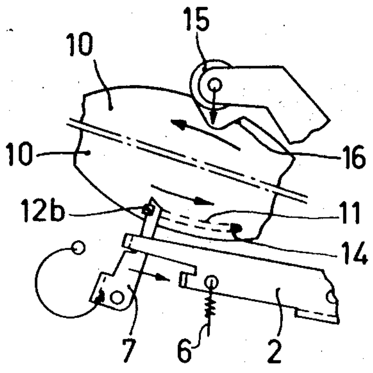

An embodiment of the invention will now be described, by way of example, with reference to the accompanying diagrammatic drawings, in which:

FIG. 1 shows schematically an on-off switch in the position "on" comprising a switching member and a pivotong lever which operates this member, FIG. 2 shows schematically the switching member and the pivoting lever in their respective positions about the switching region of the on-off switch, FIG. 3 shows schematically the position of the pivoting lever relative to the switch-off track on the cam disc with the on-off switch in the position "off", FIG. 4 is a sectional view of the cam disc in the region of the switch-off track with the leaf spring in the rest position, FIG. 5 is a sectional view of the cam disc in the region of the switch-off track with the follower pin moving over the leaf spring, and FIG. 6 shows schematically the switching device according to the invention during shut-off.

Referring now to FIG. 1, there is provided a switching member 2 for operating the switch key of an on-off switch 1 secured to the mounting plate of the record changer. This member takes the form of a one-armed lever and is pivotable about a pivot 3. A lug 5 of the switching member 2 extends into an opening 4 in the key. The on-off switch may be moved to the positions "on" and "off" by small clockwise and counterclockwise movements respectively of the switching member. A tension spring 6, the purpose of which will be described more fully hereinafter, is secured at one end to the lever arm of the switching member and at the other end to the mounting plate, so that the switching member is spring-loaded. The spring-loaded switching member tends to depress the on-off switch from the "on" position shown in FIG. 1 to the "out" position. However, the switching member has a bent part 9 which cooperates with a stepped pivoting lever 7 which is influenced by a spring 8, so that in the position shown of the lever 7 the switching member 2 is locked.

In FIG. 2 the switching range of an on-off switch is indicated by arrows. The Figure shows that the range of the pivoting movement of the switching member around the switch-on point is very small. When the pivoting lever 7 is pivoted in a clockwise direction, as indicated by an arrow in FIG. 1, the lug 9 of the switching member 2 slips on to the next step of the lever 7 when this has reached a given position. The very small switching range of the on-off switch lies in this transition. Such a small switching range is required in principle to ensure that the time which elapses between the actuation of the on-off switch and the shut-off of the apparatus is always the same.

FIG. 3 shows the position of the on-off switch comprising the switching member and the pivoting lever relative to a control cam disc 10. In this Figure the lug 9 of the switching member 2 engages the upper of the two steps of the lever 7, the switching member being held in this position by the force of the spring 6. The switching member locks the on-off member 1 in the "off" position. There is shown part of the switch-off track which is provided on the other surface of the control cam and in which lies an initially tensioned leaf spring 11 a bent part 12 of which projects through the cam disc. The function of the initially tensioned leaf spring 11 the bent part 12 of which comprises two portions 12*a* and 12*b* at right angles to one another will be apparent from FIGS. 4 and 5. As long as a follower pin 13 provided on a control lever does not run in the switch-off track the leaf spring 11 remains in the position shown in FIG. 4 relative to its end 14 secured to the bottom of the track owing to the initial tension indicated by an arrow in FIG. 4. The end of the pivoting lever 7 which lies outside the path along which the bent spring portion 12*b* travels cannot be impeded by this portion 12*b* when the cam disc rotates during the change operations. In FIG. 5 the follower pin 13 has been guided into the switch-off track at a signal and has already travelled over the leaf spring 11 to the end thereof and in doing so has pressed the leaf spring portions 12*a* and 12*b* through an opening formed in the cam disc. In this raised position the leaf spring portions 12*a* and 12*b* lie within the range of the pivoting lever 7.

FIG. 6 is a plan view of the shut-off device in the shut-off phase. The arrows on the cam disc 10 indicate its direction of rotation. The end of the pivoting lever 7 has already been engaged by the bent end of the leaf spring and the follower pin 13 has already left the leaf spring so that the latter has resiled and the end of the pivoting lever is clamped between the cam disc and the leaf spring portion 12*b*. The leaf spring still is rotating and drives the pivoting lever which is pivoted counterclockwise with respect to its pivot point. As a result the engagement between the lug 9 of the switching member 2 and the pivoting lever 7 is terminated, and the switching member is pivoted in a counterclockwise direction by the spring 6. The lug 9 engages the edge of the next step of the pivoting lever 7. At this instant an interval roller 15 is disposed on the brink of a recess 16 formed in the outer periphery of the cam disc. Under the influence of the spring 6 the switching member 2 is pivoted further in a counterclockwise direction and entrains the lever 7, which consequently pivots in a clockwise direction, its free end being retracted from the hooked part of the leaf spring 12 under which it was clamped. At this instant at which the interval roller lies on the brink of the recess 16 and does not need an additional torque of the cam disc to descend into the recess, the lug 9 of the switching member has reached the position relative to the switch lever shown in FIG. 2. As has been mentioned hereinbefore, the switching range of the on-off switch lies in this region, so that when the lug 9 of the switching member 2 moves on to the upper step of the lever 7 the on-off switch is moved into the off position. Thus it is ensured that the on-off switch shuts the apparatus off only when the interval roller, without requiring an impulse, automatically rolls down the slope of the recess 16, thereby moving the cam disc to its initial position. It is further ensured that the leaf spring 11 is permitted to return to its rest position, because the spring 6 secured to the switching member 2 pulls the free end of the pivoting lever 7 out of the hooked leaf spring end 12 after the apparatus has been shut-off.

What is claimed is:

1. A shut-off device for a record changer comprising an on-off switch carried by the changer to be switched off after playback of a last record, a pivotally mounted lever in cooperative engagement with said switch and mounted for movement from a first position to a second position to actuate said switch to the off condition, a rotatably mounted cam disc for controlling the change operation, a switch-off track carried on said cam disc, a control lever movable in response to playback of the last record, a follower pin carried on said control lever and guided into said switch-off track by said control lever after the last record has been played so that said pin will initiate shut-off when travelling in said switch-off track before returning to a starting position, a leaf spring one end of which is secured to the bottom of said switch-off track, said leaf spring being tensioned so that the other end thereof is biased away from said track, a bent portion carried by said other end of said leaf spring, an opening in said cam disc for receiving said bent portion of said leaf spring which extends through said cam disc when said follower pin runs over said leaf spring so as to depress said other end thereof, said bent end engaging said pivotal lever upon extension through said opening to cause pivotal movement thereof through a given distance and time delay to said second position upon continued rotation of said cam disc.

2. The shut-off device according to claim 1 further comprising a second bent portion carried by said first-mentioned bent portion of said leaf spring for engaging the rear surface of said cam disc when the follower pin does not contact the leaf spring.

3. The shut-off device according to claim 1 wherein said leaf spring is elongated over a distance in said switch-off track such that the follower pin rides thereon until after said pivotal lever has moved to the second position and initiates switch-off of the on-off switch.

4. The shut-off device according to claim 1 wherein said on-off switch comprises a movable switch operating lever, means connected to said switch operating lever for urging it toward the off condition, and wherein said pivotal lever has a stepped portion, said operating lever engaging said stepped portion so that upon pivotal movement of said pivotal lever said operating lever will be released permitting it to be moved to the off position.

5. The shut-off device according to claim 4 wherein said leaf spring is tensioned so as to clamp said pivotal lever after said follower pin is run off the leaf spring, said pivotal lever being released when the operating lever is released from the stepped portion of said pivotal lever.

* * * * *

PO-1050
(5/69)

UNITED STATES PATENT OFFICE
CERTIFICATE OF CORRECTION

Patent No. 3,825,269 Dated July 23, 1974

Inventor(s) KURT EISEMANN

It is certified that error appears in the above-identified patent and that said Letters Patent are hereby corrected as shown below:

IN THE TITLE:

Foreign Application Priority Data should be changed to

--P.2125708.9--

Signed and sealed this 29th day of October 1974.

(SEAL)
Attest:

McCOY M. GIBSON JR.
Attesting Officer

C. MARSHALL DANN
Commissioner of Patents